May 30, 1967     E. HENRY-BIABAUD     3,322,420
ANTI-SWAY DEVICE FOR AUTOMOTIVE VEHICLE
Filed Feb. 25, 1965     4 Sheets-Sheet 1

INVENTOR:
Edmond Henry-Biabaud
BY
Karl F. Ross
Attorney

May 30, 1967  E. HENRY-BIABAUD  3,322,420
ANTI-SWAY DEVICE FOR AUTOMOTIVE VEHICLE
Filed Feb. 25, 1965  4 Sheets-Sheet 2

INVENTOR:
Edmond Henry-Biabaud

BY  Karl G. Ross
Attorney

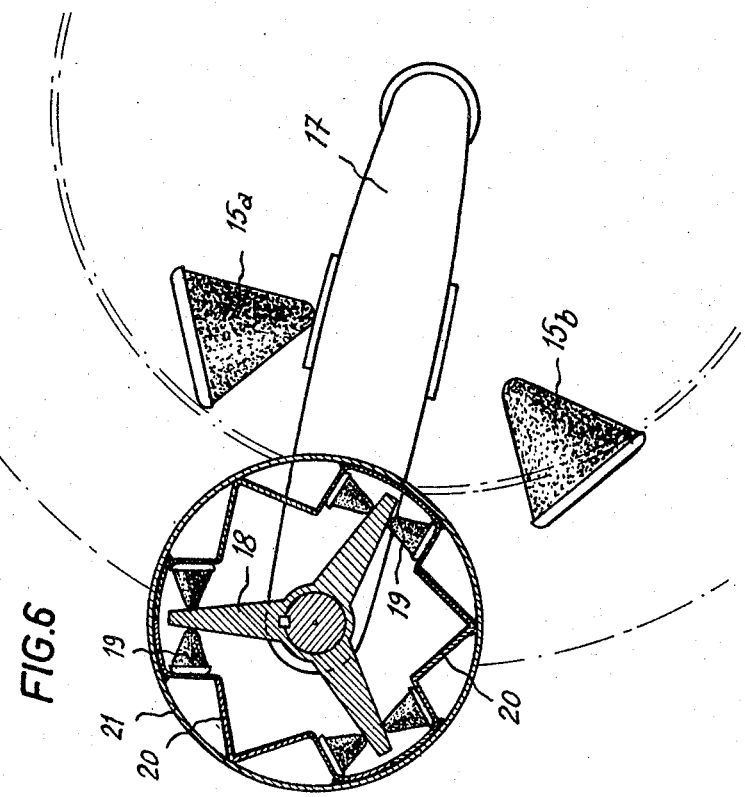
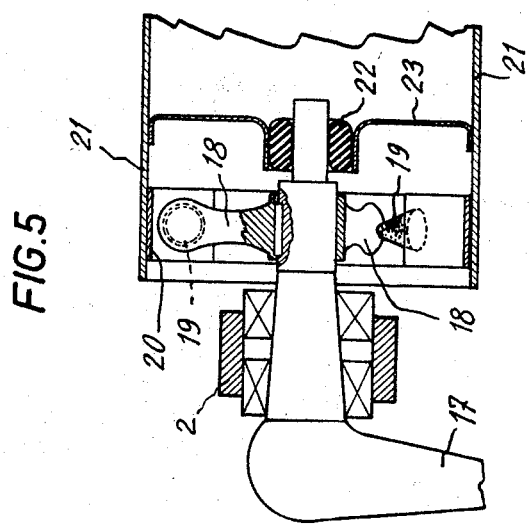

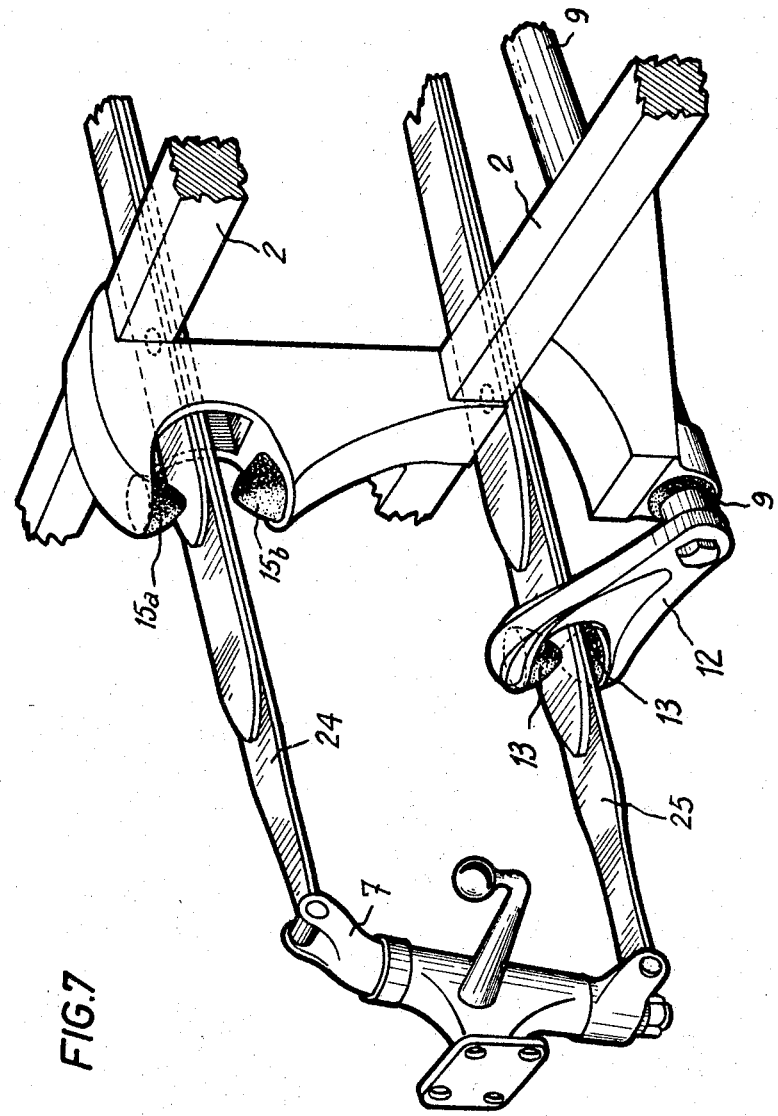

United States Patent Office 3,322,420
Patented May 30, 1967

3,322,420
ANTI-SWAY DEVICE FOR AUTOMOTIVE VEHICLE
Edmond Henry-Biabaud, Paris, France, assignor to Societe Anonyme Andre Citroen, Paris, France, a corporation of France
Filed Feb. 25, 1965, Ser. No. 435,253
Claims priority, application France, Feb. 25, 1964, 3,110
7 Claims. (Cl. 267—11)

This invention relates to anti-sway devices for automotive vehicles.

An automotive vehicle is normally provided with a device which opposes the swaying that is apt to occur, in particular when the vehicle swerves. The effect of such a device, when the height of a wheel varies in relation to the chassis, is to set up a resilient restoring torque tending to bring the wheel and chassis back into their initial or normal relative position.

The mechanical anti-sway devices produced hitherto have had an almost linear characteristic. Such a device should not be too rigid, however, since otherwise unevenness in the road surface would be transmitted to the vehicle body. Hence, notwithstanding the presence of these devices, which have relatively high elastic deformation, the vehicle may sway considerably when negotiating a curve at high speed.

According to the present invention there is provided an anti-sway device, for an automobile vehicle, comprising a first member which is movable in opposite directions in response to upward and downward movement of a wheel of the vehicle relative to the chassis, a second member mounted on said chassis, and resilient means, whose rigidity increases with deformation, disposed between said members and effective to oppose movement of said first member in both directions.

The resilient member may be of any suitable kind, such as a pneumatic damper, a coil spring or a pad of elastomer material which is conical or ogival in section.

By means of the invention, the anti-swaying torque increases at a rate greater than linear with swaying of the vehicle, so that the angle of sway of the latter is smaller than with an anti-sway device of the usual type, though the suspension retains its normal flexibility. By suitable choice of the law of variation between the resilient restoring force and the deformation of the resilient member—determined by the cross-section of the pad, in the case of a rubber pad—it is possible to obtain any desired law of increase (exponential, for example) for the anti-sway reaction.

The anti-sway device of the present invention is of particular advantage in the case of a vehicle that has pads limiting the excursion of the wheel-supporting members. Hitherto, in the event of severe swaying, the supporting members generally made contact with one of their pads, namely the top pad for the supporting member of the increasingly stressed wheel and the bottom pad for the supporting member of the decreasingly stressed wheel. The suspension then becomes very hard.

With the present device, on the contrary, the angular displacement between the wheel supporting members being limited, the bottom pad of the member supporting the decreasingly stressed wheel is not brought into play.

Three forms of anti-sway device in accordance with the invention will now be described, by way of example only, with reference to the accompanying drawing in which:

FIGURE 5 is a sectional view of an anti-sway device, in accordance with the invention, applied to a vehicle in which each wheel has only a single cranked support;

FIGURE 6 is a cross-section in a plane normal to that of FIGURE 5 and showing the torque-transmitting tube; and FIGURE 7 is a perspective view of an anti-sway device, in accordance with the invention, applied to a vehicle fitted with a leaf-spring suspension.

Figure 1:
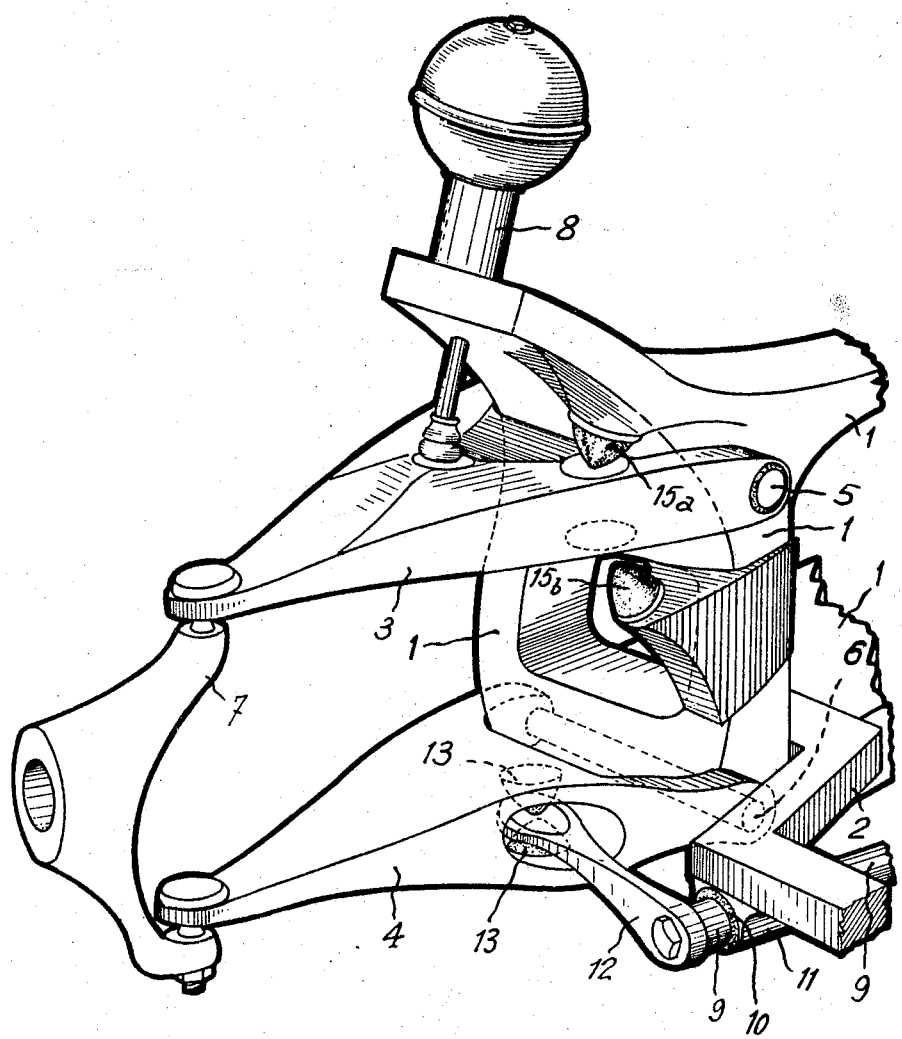
FIGURE 1 is a perspective view of a vehicular wheel suspension having two wheel-supporting arms and further having an anti-sway device in accordance with the invention applied to each of the two supporting arms.

FIGURE 1 shows a cradle 1 fixed transversely to the main side members 2 of the chassis frame of the vehicle. Upper and lower wheel-supporting arms 3 and 4, respectively, which are parallel in the example shown, but need not be so, are mounted by pivot pins 5 and 6 respectively at each side of cradle 1 and connected to the corresponding axle bracket 7. A resilient suspension member 8 is interposed between each upper arm 3 (only one of which is shown) and cradle 1. The member 8 is here illustrated as being a pneumatic damper, but it could be of any other type, such as a coil spring or a torsion bar.

Figure 2:
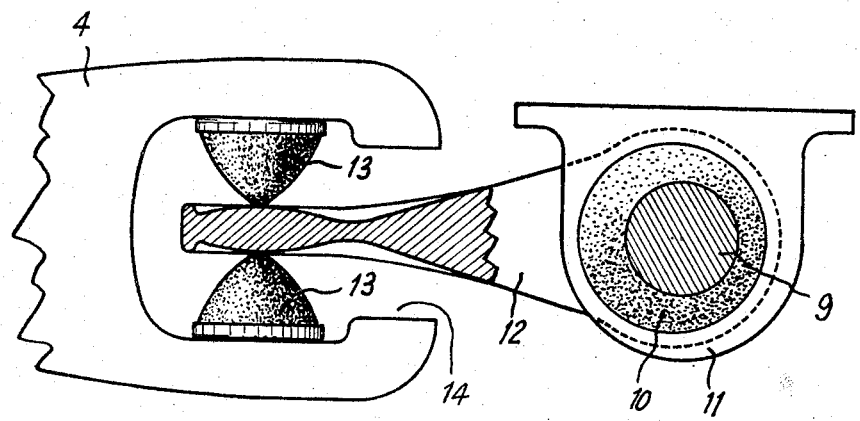
FIGURE 2 is a cross-sectional view of the suspension showing one of the supporting arms and a lever connected to a torque-transmitting tube.

A rigid cross-link in the form of a shaft or bar 9 is mounted to pivot in resilient bearings 10 carried by plain bearings 11 fixed to frame members 2. A lever or crank arm 12 is fixed to each end of this tube, the free end of the lever being inserted between two resilient pads 13 fixed opposite each other within recess 14 in the corresponding lower support 4 (FIGURE 2). These pads 13 are of increasing cross-section from the extremity in contact with lever 12 to their base. Hence their rigidity increases with the amplitude of the pivoting movement of lever 12. They respond with relatively little rigidity to small excursions of the lever, whereas their rigidity of response to large excursions is, on the contrary, very high.

The upper supporting arm 3 lies between two resilient pads 15a and 15b carried by cradle 1. In the normal position, that is to say with zero sway, arm 3 is substantially in contact with the tip of top pad 15a, whereas there is some clearance, on the other hand, between this arm and the tip of bottom pad 15b.

When only one of the wheels undergoes a slight vertical displacement relative to the chassis, one of the pads 13 on its supporting arm 4 is compressed, but the torque thus exerted on bar 9 is only minor and, owing to the inertia of the various moving parts, insufficient to affect the supporting arm of the other wheel. The suspension retains its normal flexibility.

On road bends, on the other hand, the body of the vehicle is liable to sway under the action of the centrifugal force to which it is subjected. Whichever supporting arm 4 is on the outside of the bend tends to swing upwards relative to the chassis, compressing its bottom pad 13, while the supporting arm at the opposite side of the vehicle swings downwards, compressing its upper pad 13. The torque thus exerted through levers 12 opposes the sway of the vehicle. When the centrifugal force is great, as when the vehicle is driven at high speed into a sharp bend, the tapered pads 13 are heavily compressed and so respond with great rigidity; the restoring torque is thus greater than with an anti-sway device of the usual kind, so that the vehicle sways less.

If, in the position of rest, arm 3 were equally spaced away from its tapered pads 15a and 15b, both arms 4 would swing through the same angle, though in opposite directions, and the coachwork would sway about its center of gravity. However, in view of the special position of pads 15a and 15b, arm 3 can swing freely downwards, whereas on its upward swing it compresses pad 15a.

Figure 3:
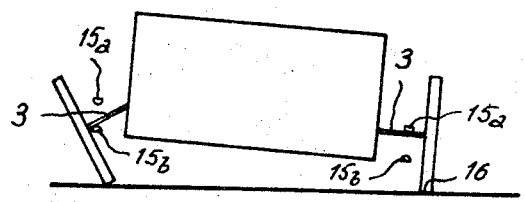
FIGURE 3 is a diagram illustrating the behavior of the vehicle in the event of swaying.

As a result of this, when a bend is being negotiated, only the supporting arms situated on the inner side of the bend will move, whereas those situated at the opposite side remain practically motionless in relation to the body, which swings about a fulcrum 16 (FIGURE 3), the point of contact of the outer wheel with the ground.

However, since the angle between the two arms 4—and hence also between the two arms 3—is less, for the same value of the centrifugal force, than that produced with an anti-sway device of the usual type, the arm 3 that is dropping has sufficient clearance available before it comes up against its bottom pad 15b; and it is also being acted on by the restoring force of the suspension. As a result, it keeps the outer stressed arm in such a position that this one can move freely to accommodate itself to unevennesses in the road surface, and the suspension retains all its flexibility.

Bearings 10 may be so shaped that their rate of work is equalized to some extent, according to the maximum stresses to which they are subjected. For instance, should these stresses act mainly along a diameter and in a particular direction, the bearing should be fitted eccentrically, so as to give it greater thickness in the direction towards which it tends to be forced. Thus, in the embodiment illustrated in FIGURES 1 and 2, bearing 10 is mounted off-center towards the rear of the vehicle.

Figure 4:
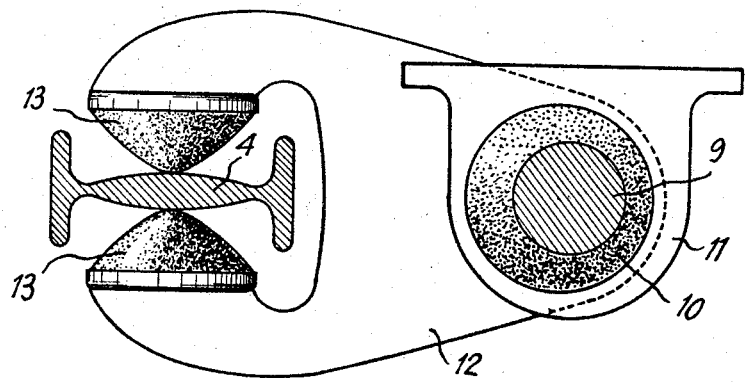
FIGURE 4 is a view, similar to that of FIGURE 2, of an alternative form of anti-sway device.

The resilient pads 13 may, but need not, be slightly under compression in the position of rest. They may be rigidly attached either to the supporting arm, as shown in FIGURES 1 and 2, or to lever 12 (FIGURE 4). The effect is slightly different, since in the latter case the leverage of member 12 is constant, whereas in the former, it increases with the angle between this member and its normal mean position.

In the embodiment of the invention illustrated in FIGURES 5 and 6, each wheel has only a single supporting arm 17 of crank or elbow type. The end portion of this arm, which is mounted to pivot on frame side member 2, carries radial vanes 18. These vanes are situated opposite pads 19 which are attached, facing each other in pairs, to a shaped sheet-metal member which is welded to a transverse sleeve 21. This sleeve is loosely mounted on the ends of the two supporting arms, thus taking the place of the transverse link 9 of the preceding embodiments, and is held in a central position by resilient bearings 22, interposed between the extremities of each spindle 17 and a plate 23 fixed to the sleeve. As before, arm 17 is linked to suspension means (not shown) and can swing between two stop pads 15a and 15b. The vanes 18 with their pads 19 represent a resilient coupling, similar to that formed by the aforedescribed pads 13 and crank arms 12, between the wheel support 17 and the tubular link 21 journaled on the chassis.

In the modification shown in FIGURE 7, a leaf-spring suspension is provided. Each axle bracket 7 is connected to frame side members 2 by an upper leaf-spring 24 and a lower leaf-spring 25.

The lower spring 25 is interposed between pads 13 of lever 12, which is fixed to rigid cross bar 9, as in the embodiment of FIGURES 1 and 2. The upper spring 24 is disposed, similarly, between the two stop pads 15a and 15b, pad 15a being substantially in contact with spring 24 when this is in its position of rest, whereas pad 15b is spaced away from it.

The invention is naturally not limited to the embodiments described above and illustrated in the drawing but includes all variants which are within the scope of the claims appended hereto.

I claim:

1. In an automotive vehicle having a first member which is movable in opposite directions in response to upward and downward movement of a wheel of the vehicle relative to the vehicle chassis, an anti-sway device comprising;
   a rotor mounted for rotation on a fixed axis,
   a plurality of radial arms on said rotor,
   means connecting said rotor to said first member to rotate said rotor in response to movement of said first member,
   a torsion tube disposed on the axis of said rotor,
   means on said torsion tube defining a pair of abutments disposed on opposite sides of each radial arm of the rotor, and
   a plurality of resilient pads having a rigidity which increases with deformation thereof, said pads being disposed on opoiste sides of each of said radial arms between the radial arm and the corresponding abutments to convert rotary movement of the rotor into torsional movement of said torsion tube.

2. In an automotive vehicle having a pair of wheel supports on opposite sides of a chassis, said supports being subject to upward and downward movement relative to said chassis upon a swaying of the vehicle, the combination therewith of a rigid transverse link rotatably journaled in said chassis and extending between said supports, resilient coupling means including a crank arm on each end of said link yieldably connecting same with the respective wheel support for converting sway-induced motions of the latter into rotations of said link, and resilient abutment means positioned to become effectve in upper and lower positions of said supports for resisting further displacement thereof relative to said chassis, said supports being movable independently of said abutment means between said upper and lower positions.

3. The combination defined in claim 2 wherein each of said supports is provided with resilient suspension means connecting it with said chassis independently of said abutment means, said suspension means being biased to hold said supports in said upper positions under normal operating conditions.

4. The combination defined in claim 3 wherein said abutment means comprises a pair of tapered pads including an upper pad and a lower pad for each wheel support, said upper pad being positioned for compression against an extension of said chassis in the upper position of the respective wheel support.

5. The combination defined in claim 4 wherein each of said supports comprises a pair of interconnected elongated members including a first member engaged by said crank arm and a second member disposed between said pair of pads.

6. The combination defined in claim 2 wherein said crank arm is rigid with said link.

7. The combination defined in claim 6 wherein said resilient coupling comprises a pair of tapered pads interposed substantially without clearance between said crank arm and said respective wheel support.

References Cited

UNITED STATES PATENTS

| | | | |
|---|---|---|---|
| 2,254,325 | 9/1941 | Slack et al. | 267—11 |
| 2,674,450 | 4/1954 | Frank | 267—11 |
| 2,792,215 | 4/1957 | Timpner et al. | 267—11 |
| 2,792,216 | 5/1957 | Janeway | 267—11 |
| 2,841,404 | 7/1958 | Eitel | 267—11 X |
| 3,181,885 | 5/1965 | Baracos et al. | 267—11 X |

FOREIGN PATENTS 899,908   12/1953   Germany.

ARTHUR L. LA POINT, *Primary Examiner.*

R. M. WOHLFARTH, *Assistant Examiner.*